(12) United States Patent
Andreini et al.

(10) Patent No.: US 12,352,560 B2
(45) Date of Patent: Jul. 8, 2025

(54) OPTICAL MEASURING MACHINE AND MEASURING METHOD

(71) Applicant: VICI & C. S.P.A., Santarcangelo di Romagna (IT)

(72) Inventors: Stefano Andreini, Santarcangelo di Romagna (IT); Paolo Maioli, Santarcangelo di Romagna (IT); Erica Masini, Santarcangelo di Romagna (IT)

(73) Assignee: VICI & C. S.P.A., Santarcangelo di Romagna (IT)

(*) Notice: Subject to any disclaimer, the term of this patent is extended or adjusted under 35 U.S.C. 154(b) by 171 days.

(21) Appl. No.: 18/043,225

(22) PCT Filed: Sep. 7, 2021

(86) PCT No.: PCT/IB2021/058116
§ 371 (c)(1),
(2) Date: Feb. 27, 2023

(87) PCT Pub. No.: WO2022/053929
PCT Pub. Date: Mar. 17, 2022

(65) Prior Publication Data
US 2023/0324169 A1 Oct. 12, 2023

(30) Foreign Application Priority Data
Sep. 8, 2020 (IT) .................... 102020000021199

(51) Int. Cl.
*G01B 11/24* (2006.01)
(52) U.S. Cl.
CPC .................... *G01B 11/24* (2013.01)
(58) Field of Classification Search
CPC ...... G01B 11/24; G01B 11/14; G01B 11/2433
(Continued)

(56) References Cited

U.S. PATENT DOCUMENTS

| 2013/0300861 | A1 | 11/2013 | Neumann et al. |
| 2015/0204798 | A1 | 7/2015 | Nygaard et al. |
| 2019/0346246 | A1* | 11/2019 | Beinemann ........ G01M 11/0221 |

FOREIGN PATENT DOCUMENTS

WO 2019207437 A1 10/2019

OTHER PUBLICATIONS

International Search Report and Written Opinion dated Nov. 29, 2021 from counterpart International Patent Application No. PCT/IB2021/058116.

* cited by examiner

Primary Examiner — Md M Rahman
(74) Attorney, Agent, or Firm — SHUTTLEWORTH & INGERSOLL, PLC; Timothy J. Klima

(57) ABSTRACT

An optical measuring machine includes an optical assembly moveable along an axial direction to acquire an image representing a workpiece, a contactless measuring device connected to the optical assembly to move with it. This contactless measuring device detects a distance between a sensitive portion thereof and a surface of the workpiece. A sensor is configured to detect an angular position around a central axis of a holding assembly, an axial position along the axial direction A control unit activates the optical assembly to acquire a first signal representing an external profile of a measuring zone comprising at first part representing a first tract of the external profile, to activate the contactless measuring device, and to acquire a second signal representing a distance between the sensitive portion and multiple portions of the measuring zone, and to reconstruct the complete geometry of the measuring zone, combining the first and second signals.

16 Claims, 7 Drawing Sheets

(58) Field of Classification Search
USPC .......................................................... 356/601
See application file for complete search history.

OPTICAL MEASURING MACHINE AND MEASURING METHOD

This application is the National Phase of International Application PCT/IB2021/058116 filed Sep. 7, 2021 which designated the U.S.

This application claims priority to Italian Patent Application No. 102020000021199 filed Sep. 8, 2020, which applications are incorporated by reference herein.

This invention concerns an optical measuring machine and a measuring method.

This invention therefore finds application in the technical sector of metrology, in particular industrial metrology.

More precisely, this invention finds principal application in the arrangement of systems capable of enabling the dimensional verification of workpieces just processed/manufactured without needing to transport the workpiece into the special metrology room.

With particular reference to measuring workpieces with a longitudinal extension, preferably rotational ones such as shafts or the like, several types of optical machines are known today, which are also successfully produced by the Applicant.

These machines generally have a pair of tailstocks (or another holding system) vertically aligned to hold the workpiece in an erect position, beside which there runs a "carriage" carrying, on the one side, a light box and, on the other, a video detection system, such as, for example, a linear video camera.

The operating principle, thus, involves performing measurements by detecting, by means of a receiver, such as, for example, the linear video camera mentioned above, the shadow that is created when the workpiece is illuminated with a direct beam of parallel rays perpendicular to the longitudinal axis thereof.

This type of measurement, now well known, finds application limits, however, in measuring dimension features that cannot be detected optically, i.e., which have a coaxial development to the luminous beam and/or are hidden.

Examples of these elements are undercuts, keys, slots, blind holes, or spotfaces, which, while being lighted, are not translated into anything defined or able to be defined in the shadow of the workpiece.

This significantly limits the number of applications for which such systems are used, in fact alienating relevant markets such as that of gears or containers.

The purpose of this invention is, thus, to provide an optical measuring machine and a measuring method capable of avoiding the drawbacks of the above-mentioned technique.

In particular, the purpose of this invention is to provide an optical measuring machine and a measuring method for measuring a workpiece with a mainly longitudinal extension, which is highly versatile and robust.

Said purposes are achieved with an optical measuring machine that has the characteristics as disclosed herein, as well as a measuring method in accordance with the present disclosure.

In particular, this optical measuring machine comprises a holding assembly for a workpiece to be measured.

The holding assembly can be rotated about a central axis to rotate said workpiece about an axis thereof.

In addition, a sensing optical assembly is also included.

This optical assembly comprises lighting means, configured to generate light radiation, and video acquisition means aligned with the lighting means along an optical path of said light radiation, transverse and incident to said central axis.

In particular, the lighting means and the video acquisition means are arranged on opposite sides of the central axis of the holding assembly, transversally to it, so that the light radiation emitted by the lighting means hits the workpiece before being detected (despite the shadow generated with the workpiece) by the video acquisition means.

The optical assembly can be moved along an axial handling direction "A" in order to enable a complete acquisition of an image representing said workpiece.

According to one aspect of the invention, the machine also comprises a contactless measuring device connected to said optical assembly to move with it along said axial direction "A".

The contactless measuring device is configured to detect a distance between a sensitive portion thereof and a surface of the workpiece to be measured.

Sensor means are also included, which are configured to detect at least one angular position around the central axis of said holding assembly and one axial position along the axial handling direction "A" of the optical assembly.

A control unit is also connected to said sensor means, said optical assembly, said holding assembly, and said contactless measuring device.

This control unit is configured for:

determining a first working position of said optical assembly;

activating said optical assembly on reaching said working position in order to strike a measuring zone of the workpiece with said light radiation and to acquire, by means of said video acquisition means, a first signal representative of an external profile of said measuring zone comprising at least one first part representing a first section of the external profile;

determining a second working position for the contactless measuring device;

activating the contactless measuring device on reaching said second working position and acquiring a second signal representing a distance between said sensitive portion and a plurality of portions of said measuring zone, in which said second signal comprises at least one first part representing said first section of the external profile of the measuring zone and at least one second part representing a geometrical feature of the workpiece that cannot be detected by means of said optical assembly;

combining said first and said second signal using, as a reference, said first parts of the first signal and second signal to reconstruct the geometry of the measuring zone.

In other words, the solution that is the subject of the invention involves combining two different measurement signals, i.e., signals that wholly or in part detect a geometrical feature of the workpiece, before generating a third signal representing the geometry of the measuring zone.

Advantageously, thanks to this solution, the optical measuring machine is able to detect and measure "negative" surfaces that cannot be detected by the image acquired via just the optical assembly.

Thanks to the presence of one or more contactless measuring sensors, the optical measuring machine thus gains the capacity to perform measurements commonly performed by special machines or tools, which would entail much longer measuring times and/or higher costs.

Furthermore, the absence of physical contact between the measuring systems (optical assembly and contactless measuring sensor) and the workpiece, significantly speeds up the acquisition procedure, as well as increasing the possible applications and the consequent versatility of the machine.

It should be noted that the control unit is preferably configured to reconstruct the geometry of the measuring zone by overlapping said first part of the second signal with said first portion of the first signal.

In other words, by being able to detect at least one common point, both with the optical assembly and with the contactless measuring sensor, the two signals acquired may be combined, using the absolute measurement of the optical assembly in order to "absolutise" the relative measurement taken using the contactless measuring device.

The presence of a contactless measuring sensor that takes a totally relative measurement, in addition, makes the sensor measurement very resistant to any thermal or mechanical deviations owing to its use, since any systematic measuring error would be totally insignificant in relation to the successive combination of signals, thanks to which the absolute reference becomes the first part of the first signal, i.e., the first tract of the external profile, the detection of which, by means of the optical assembly, is, as mentioned, more resistant to disturbances and deviations.

Structurally, the contactless measuring device can preferably be moved in relation to the optical assembly along a radial direction transverse (more preferably, orthogonal) to the axial direction "A".

The contactless measuring device is preferably attached to the optical assembly through a slide oriented along said radial direction and comprises an actuator element configured to move it close to and away from said central axis.

Advantageously, in this way, the control unit can drive the actuator element independently of the optical carriage and position the contactless measuring device in an optimal position for the detection of portions hidden to the optical assembly.

In addition, the contactless measuring device is preferably a device equipped with a confocal sensor, which maximises the number of the machine's applications.

Additional features and the corresponding technical advantages will be made clearer by the following, illustrative, and non-limiting, description of a preferred, and therefore non-exclusive, embodiment of an optical measuring machine for measuring a workpiece with a mainly longitudinal extension according to what is illustrated in the attached drawings, wherein.

Figure 1:
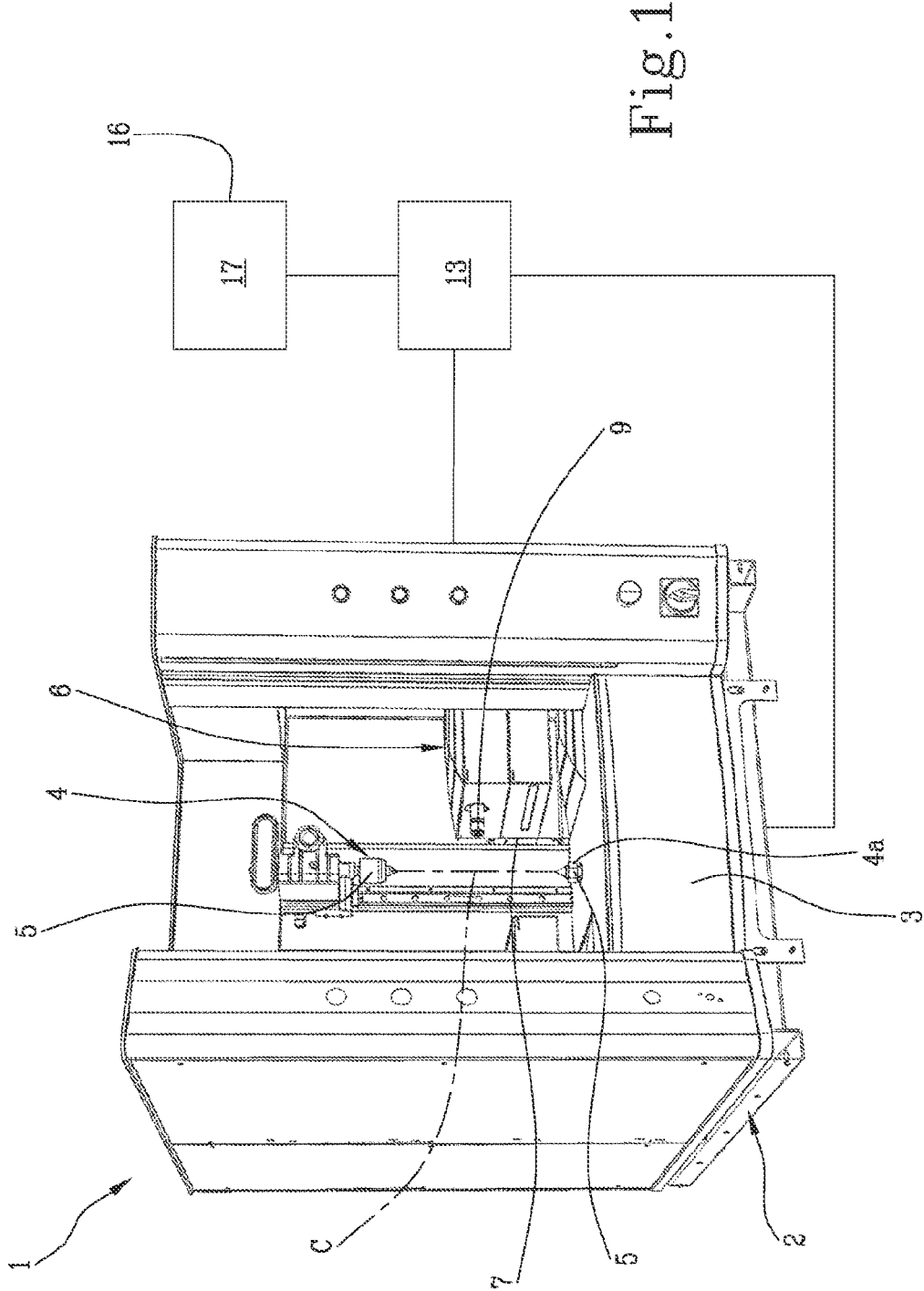
FIG. 1 shows a schematic, perspective view of an optical measuring machine according to this invention.
Figure 2:
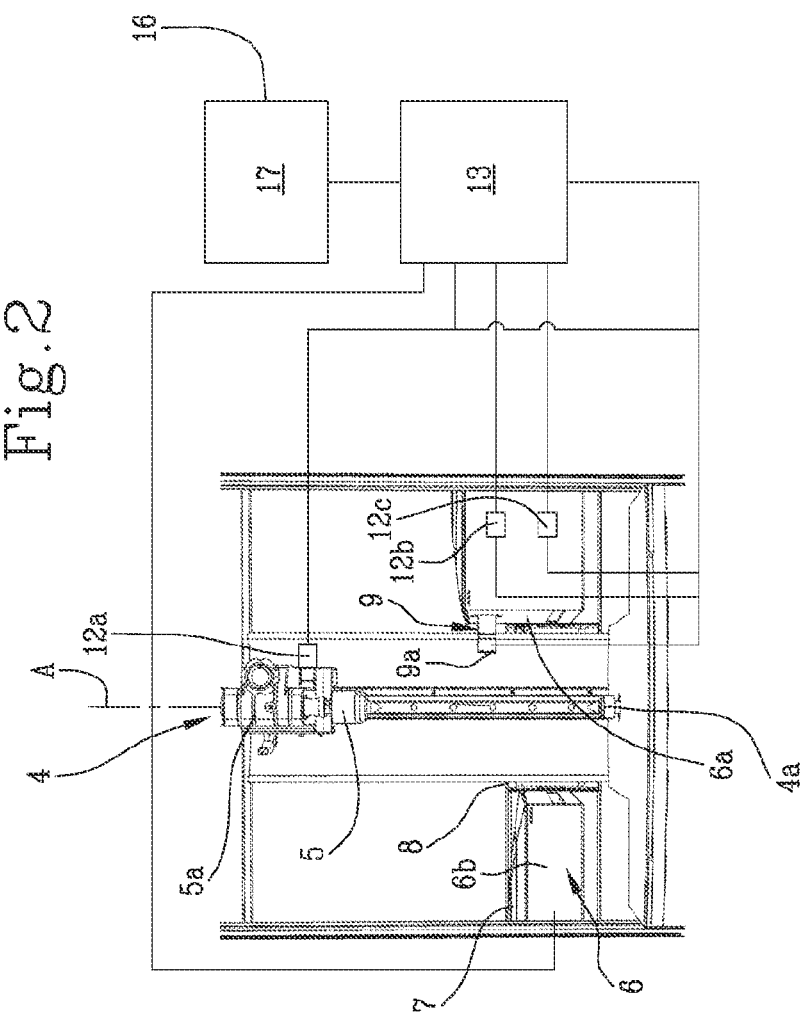
FIG. 2 shows a front view of a portion of the machine in FIG. 1.
Figure 3:
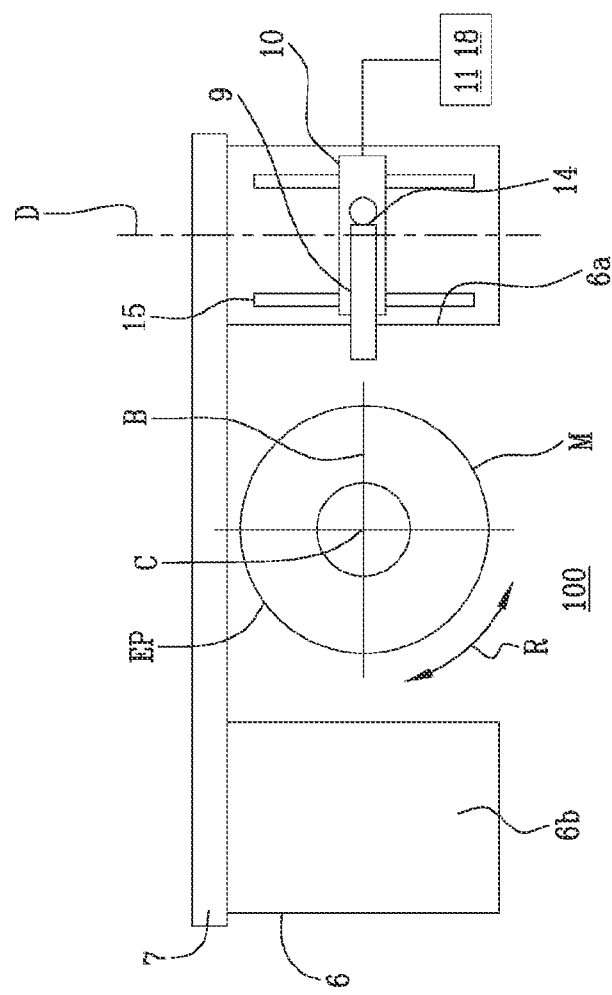
FIG. 3 shows a plan view of a portion of the machine in FIG. 1.
Figure 4:
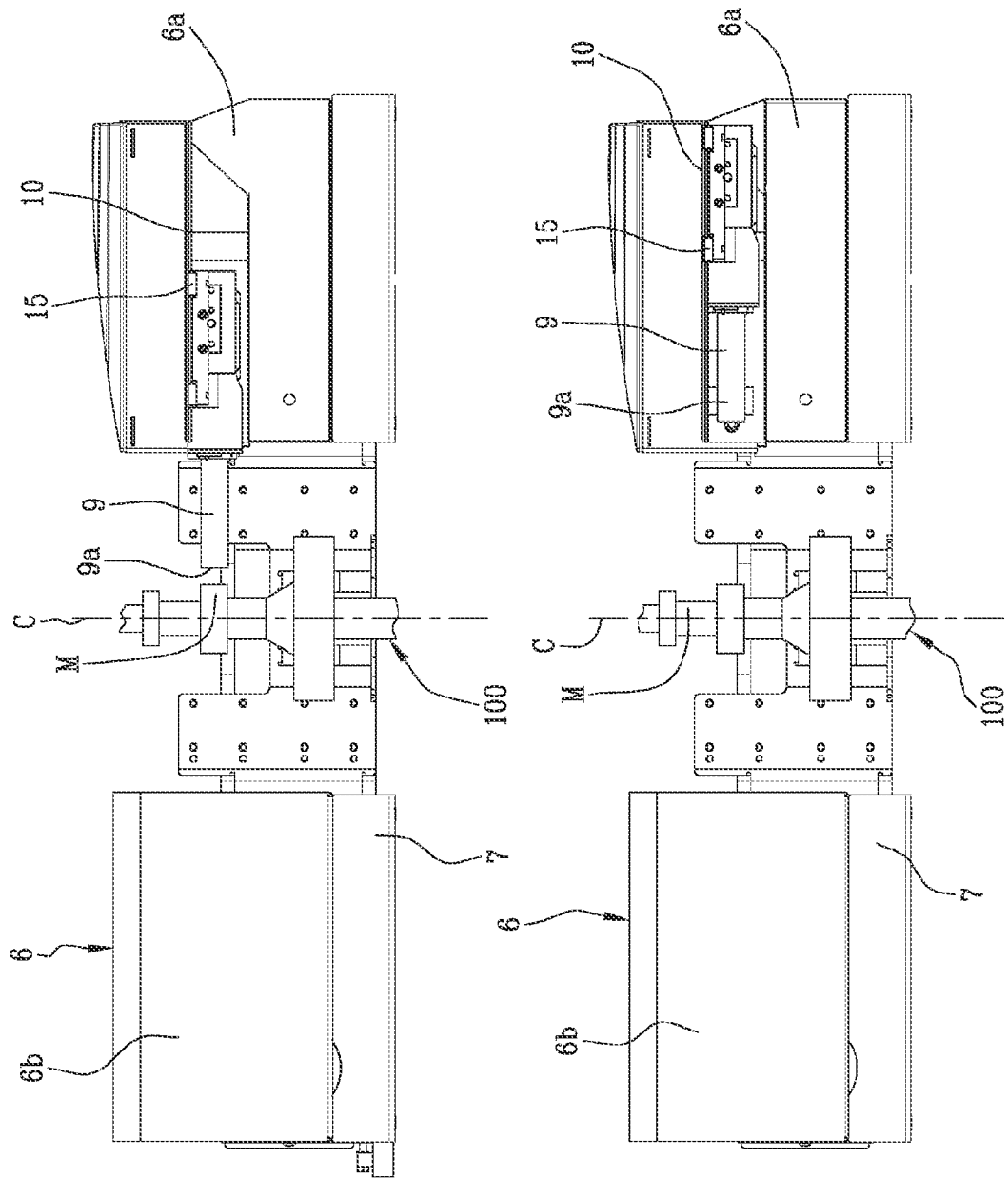
FIGS. 4a-4b show a detail of the machine in FIG. 2 in different operating configurations.

With reference to the attached figures, reference number 1 indicates an optical measuring machine according to this invention.

As mentioned, the machine 1 is mainly of the optoelectronic type, i.e., it exploits the interaction between the workpiece and a light beam in order to detect the specific dimensions.

This machine is mainly configured to measure workpieces 100 that have a central axis that may be used as a rotation axis, favouring the acquisition of the profile or of the shape of the workpiece in all the angular measurement positions.

The machine 1 comprises a support frame 2 that has a base 3 shaped in order to enable the positioning of the machine on a rest surface, preferably a horizontal one.

The base preferably has multiple feet (not illustrated) that can be adjusted to enable a precise levelling with the rest surface, even where the surface has an irregular shape.

In general, the machine 1 comprises a holding assembly 4 for said workpiece 100, a sensing optical assembly 6, a contactless measuring device 9, sensor means 12, and a control unit 13.

The holding assembly 4 is provided with at least one gripping portion 4a arranged at a central axis "C", which, in use, corresponds to an axis of the workpiece 100 to be measured, preferably a rotation axis thereof.

In the preferred embodiment, the central axis "C" is basically vertical.

In some embodiments, the holding assembly 4 is provided with two jaws 5 that can be moved closer to and/or further from each other between a distanced position, for release, and a near position, for clamping, in order to hold workpieces that have different longitudinal (i.e., axial) extensions.

These jaws 5 preferably each comprise at least one point 5a that can be coupled to a corresponding longitudinal end of the workpiece 100 at the central axis "C".

In other words, in these embodiments, the holding assembly 4 is defined by two "tailstocks" (or by a pair of bit-tailstock), a particularly efficient and precise solution.

In other embodiments, the holding assembly comprises a vice or a wedge configured to hold the workpiece 100 at one end thereof, potentially leaving the other end free (evaluated along the central axis "C").

The use of one type of holding device or of the other is arbitrary and a function of the type of products that the measuring machine is devised to analyse.

For example, for workpieces with an elongated shape, such as shafts or screws, it is usually preferable to use jaw or tailstock holding assemblies.

On the contrary, for components of another kind, such as gears, containers, or bottles a vice or wedge holding assembly could be preferable.

In order to enable the measurement of the workpiece in all the angular positions (as well as to perform measurements of eccentricity or the like), the holding assembly 4 can be rotated about said central axis "C" so as to rotate said workpiece 100 about the central axis thereof.

A rotating actuator 5a is, thus, preferably included, which is connected to the gripping portion 4a of the holding assembly.

In the preferred embodiment, the rotating actuator comprises an electric motor or electrospindle.

The sensing optical assembly 6 is provided with lighting means 6a, configured to generate light radiation, and video acquisition means 6b aligned between them along an optical path of said light radiation. Thus, the lighting means 6a and the video acquisition means 6b are telecentric.

This optical path is transverse (preferably orthogonal) and incident to the central axis "C" so as to hit the workpiece 100 to be measured.

In particular, the lighting means 6a and the video acquisition means 6b are arranged on opposite sides of the central axis "C", transversely to it, so that the light radiation emitted by the lighting means 6a hits the workpiece 100 before being detected (despite the shadow generated with the workpiece 100) by the video acquisition means 6b.

The optical assembly 6 is, thus, configured to generate a first signal S1 representing the outline of the workpiece 100 detected by the video acquisition means 6b and to make said first signal S1 available to the control unit 13.

In the preferred embodiment, the lighting means 6a comprise an LED light source and at least one telecentric optical system.

The video acquisition means 6b preferably comprise a video camera.

It should be noted that, in order to enable the complete acquisition of an image representing said piece 100, the optical assembly 6 can be moved along an axial direction "A" parallel to said central axis "C".

To this end, the optical assembly 6 is mounted on a carriage 7 that is attached, so it can slide, to the frame 2 and can be moved along the central axis "C" (i.e., vertically).

A handling (or lifting) assembly 8 is also included, connected to the carriage 7 and configured to move it along the central axis "C" between a first and second position.

In the preferred embodiment, the central axis "C" is, as mentioned, basically vertical and the handling assembly 8 is configured to move the optical assembly along the axial direction "A" (i.e., along the central axis "C") between a raised position (corresponding to the first position) and a lowered position (corresponding to the second position).

The contactless measuring device 9 is configured to detect a distance between a sensitive portion 9a thereof and a surface of the workpiece 100 to be measured.

The contactless measuring device 9 is, therefore, preferably a distance sensor, which, therefore, detects a relative measurement and not an absolute quantity representing the shape of the workpiece 100.

The contactless measuring device 9 is preferably connected to the optical assembly 6 in order to move with it along the axial direction "A", i.e., parallel to said central axis "C".

More precisely, the contactless measuring device 9 is attached to the carriage 7 of the optical assembly 6, preferably at a level beyond said optical path of the lighting means 6a.

In addition, the contactless measuring device 9 is preferably movable in relation to the optical assembly 6 orthogonally to the central axis "C".

More precisely, the contactless measuring device 9 can, at least in part, be moved closer to and further away from the central axis "C" (i.e., the workpiece 100) between a rest position and an operating position.

The contactless measuring device 9 is, thus, preferably movable along a first operating direction "B", which is, preferably, "radial", i.e., orthogonal to the central axis "C".

It should be noted that, the "operating position" is not unique, but can be suitably altered as a function of the geometry of the workpiece 100, as will be better clarified in what follows.

Preferably, therefore, the contactless measuring device 9 is attached to the optical assembly 6, in particular to the carriage 7, so that it can slide, via a slide 10 that is orthogonal to the central axis "C".

In order to enable the handling of the contactless measuring device 9, a (linear) actuator element 11 is included, which is operationally placed between the device 9 and the slide 10 and configured to translate at least part of the device along the radial direction.

In addition, in a preferred embodiment, the contactless measuring device 9 is preferably movable in relation to the optical assembly 6 transversely, preferably orthogonally, both to the first operating direction "B" and to the central axis "C".

Therefore, the contactless measuring device 9 is preferably movable in relation to the optical assembly 6 along two directions orthogonal to each other, the first operating direction "B" and a second operating direction "D".

The first "B" and the second operating direction "D" are preferably horizontal and both orthogonal to the central axis "C" and to the axial direction "A".

Therefore, the contactless measuring device 9 preferably comprises a support body that can be attached to the optical assembly 6 so that it slides, in particular to the carriage 7, via a first linear guide 10 and a second linear guide 15 orthogonal to each other.

The presence of a first linear actuator 11 is preferably included, therefore, and a second linear actuator 18 designed to handle the support body of the contactless measuring device 9 along the two operating directions "B", "C".

In some embodiments, the contactless measuring device 9 is attached to the optical assembly 6 by one or more rotational joints 14 that allow a variation in the inclination thereof in relation to the workpiece 100 on one or more planes.

It should be noted that the rotational joint 14 is preferably placed between the sensitive portion 9a of the contactless measuring device 9 and the carriage 7.

In the preferred embodiment, the rotational joint 14 is additional in relation to the slide 10 (or to the slides 10, 15), thus enabling the sensitive portion 9a of the contactless measuring device 9 to be optimally positioned as a function of the application.

In some embodiments, an actuator that enables the sensor to rotate automatically is attached to the rotational joint (or to the rotational joints) 14.

Alternatively, these joints could be joined to manual adjustment means that enable movement of the contactless measuring device upstream of the measuring.

Thus, in the preferred embodiment, the contactless measuring device 9 can move vertically with the optical assembly 9, i.e., with the carriage 7, and horizontally in relation to the optical assembly 6 (linearly and/or rotationally).

In this way, the configuration attributed to the contactless measuring device 9 can be modified by the user, depending on the measurement to take.

The technical advantage associated with this latter degree of freedom becomes clear when the relative inclination between the surface of the portion of the measuring zone "M" and the perpendicular to the direction of the beam emitted by the sensitive portion 9a exceeds the maximum inclination value allowed by the device. This can happen, for example, with gears, since the side of the teeth could have an inclination angle greater than 45°, a value that is often excessive for some types of contactless sensors (e.g., confocal ones), which provide better performance when the surface to be detected is perpendicular to the direction of their beam.

The contactless measuring device 9, as mentioned, is configured to detect a distance between a sensitive portion 9a thereof and a surface of the workpiece 100 to be measured.

In this respect, the contactless measuring device 9 is configured to generate a second signal S2 representing a distance between said sensitive portion 9a and a portion of the workpiece 100 incident to the wave emitted by the sensor (e.g., light radiation, laser, etc.).

In the preferred embodiment, the contactless measuring device 9 comprises a confocal sensor 9b, preferably a chromatic-confocal sensor.

In this embodiment, the beam emitted by the sensor is a light beam, preferably generated by a white light source.

Alternatively, the contactless measuring sensors 9 could comprise a laser triangulation sensor or an interferometric sensor.

In order to detect all the positions of the movable elements (holding assembly 4, optical assembly 6/carriage 7 and contactless measuring device 9), the measuring machine 1 comprises special sensor means 12.

These sensor means 12 are configured to detect:
at least one angular position around the central axis "C" of said holding assembly 4,
at least one axial position along the central axis "C" of the optical assembly 6 and/or of the carriage 7;
in the embodiments wherein the contactless measuring device 9 makes a radial movement, at least one radial position orthogonal to said central axis "C" of the sensitive portion 9a,
in the embodiments wherein the contactless measuring device 9 makes a rotational movement, one or more angular positions of the sensitive portion 9a of the contactless measuring device 9.

These sensor means 12 are, thus, configured to detect these quantities and to provide signals representing the same.

In the preferred embodiment, the sensor means 12 thus comprise at least one encoder 12a connected to the holding assembly 4 and an optical ruler 12a connected to the carriage 7.

Thus, the encoder 12a is configured to detect the angular position of the holding assembly 4 (i.e., of the workpiece), while the optical ruler 12a is configured to detect the axial position of the optical assembly 6.

Where this movement occurs, the sensor means 12 also comprise an additional optical ruler 12b joined to the slide 10 and configured to detect the radial position of the sensitive portion 9a.

In addition, in the more advanced embodiments, the sensor means 12 comprise an additional encoder connected to the sensitive portion 9a of the contactless measuring device and configured to detect the angular position thereof.

The control unit 13 is, thus, configured to receive corresponding signals from the sensor means 12 and to drive the holding assembly 4, the optical assembly 6, and the contactless measuring device 9, as a function of a pre-set measuring programme.

More precisely, the control unit 13 is configured to drive the rotating actuator 5a, the handling assembly 8, and any actuator element 11 depending on said measuring program (and on signals generated by the sensor means).

According to one aspect of the invention, during said measuring program, the control unit 13 is configured to determine a first working position of said optical assembly 6 and to activate said optical assembly 6 on reaching the first working position.

The control unit 13 is preferably configured to impart a movement along said axis A to the optical assembly 6 and to stop the optical assembly 6 on reaching the first working position.

In this way, a measuring zone "M" of the workpiece 100 is hit with the light radiation.

The control unit 13 is also configured to acquire, using said video acquisition means 6a a first signal S1 representing an external profile "EP" of said measuring zone "M".

The first signal S1 comprises at least one first part S1' representing a first tract of the external profile "EP".

In particular, depending on the type of workpiece 100 to be measured, the control unit can activate the optical assembly 6 at the same time as the axial handling thereof in order to perform a "scan" of the workpiece or to activate the optical assembly 6 only at one or more pre-set working positions (or those determined by the user).

In addition, according to the invention, the control unit 13 is configured to determine a second working position for the contactless measuring device 9.

The second working position is preferably determined as a function of the type of workpiece, for example, in relation to a particular processing that cannot be detected using the optical assembly 6.

Preferably, therefore, following said acquisition of the first signal S1, the control unit 13 is configured to identify an axial level and/or a radial position of the second working position and to bring the optical assembly 6 (i.e., the carriage 7) to an axial level of the second working position.

The control unit 13 is, thus, configured for:
imparting a movement along the axial direction "A" to the contactless measuring device 9 in order to bring it to an axial level of the second working position and, if necessary, a movement along a direction orthogonal to said axial direction "A" (i.e., along the radial direction "B"), approaching said central axis of the holding assembly 4.

It thus identified when the contactless measuring device 9 reaches said second working position, which may remain unvaried during the measuring or uniquely determine an initial position of the measuring.

In some embodiments, in fact, the control unit 13 is configured to stop the contactless measuring device 9 when it reaches said second working position 9, potentially moving the workpiece 100 for the acquisition of a measurement in several portions of the measuring zone "M".

Alternatively, the control unit 13, on reaching the second working position, could impart new axial, radial, and/or rotational movements to the contactless measuring device 9 to perform a "dynamic" measurement.

A hybrid embodiment is also possible, wherein both the workpiece 100 and the contactless measuring device 9 are moved.

It should also be noted that the axial position of the carriage 7, during the scanning of the workpiece 100 using the optical assembly 6, or during the measurement by the contactless measuring device 9, can be different, despite the measuring zone "M" being the same, for example, due to an axial misalignment between the sensitive portion 9a of the contactless measuring device 9 and the lighting means 6a (or the video acquisition means 6b).

In any case, for the control unit 13 the axial distance between these elements is known and it is, therefore, possible to correctly position the sensors.

The control unit 13 is, in any case, arranged to activate the contactless measuring device 9 on reaching said second working position and to acquire a second signal S2 representing a distance between said sensitive portion 9a and multiple portions of said measuring zone "M".

It should be noted that the second signal S2 comprises at least one first part S2' representing the first tract of the external profile "EP" of the measuring zone "M" and at least one second part S2" representing a geometrical feature of the workpiece that cannot be detected using said optical assembly 6.

In other words, the control unit 13 is configured to measure at least one portion of the measuring zone "M" already scanned by the optical assembly 6 using the contactless measuring device 9.

According to the invention, the control unit 13 is also configured to combine said first S1 and said second signal S2 together using, as a reference, said first parts S1', S2' of the first signal S1 and of the second signal S2 to reconstruct the geometry of the measuring zone "M".

In other words, the complete geometry of the measuring zone "M" is reconstructed by combining said first signal S1 and said second signal S2 together, using, as a reference, said first parts S1', S2' of the first signal S1 and of the second signal S2.

Thus, the control unit 13 is configured to combine together said first S1 and said second signal S2 using said first parts S1', S2' of the first signal S1 and of the second signal S2 as a reference, and to generate a third signal S3 having an item of information representing both said first S1 and second signal S2 and identifying the geometry of the measuring zone M.

Therefore, the solution that is the subject of the invention involves combining two different measurement signals (the first S1 and the second signal S2), i.e., signals that wholly or in part detect a geometrical feature of the workpiece, before generating a third signal representing the geometry of the measuring zone.

The second signal S2 may also be the result of a transformation and/or a filtering of the signal acquired by the contactless measuring sensor 9.

In the preferred embodiments, the control unit 13 is, in fact, configured to:
  receive from the contactless measuring device 9 a measurement signal MS representing the distances actually detected by the sensitive portion 9a;
  process said measurement signal MS in order to filter the noise and reconstruct any missing portions of the measurement signal MS according to one or more predefined algorithms;
  generate said second signal S2 as a result of said processing.

The measurement signal MS processing step is particularly advantageous in its use of contactless measuring devices 9, which often have a higher variability in measurement accuracy depending on the angle of incidence of the generated beam of the sensitive portion 9a and the surface incident to the measuring zone "M".

For example, in measuring profiles such as gears or the like, the sides of the teeth may, in some cases, have an inclination such as to render the detection of the distance in some points highly disturbed or, in extreme cases, impossible.

The preparation of one or more algorithms that enable the control unit 13 to compensate for these gaps and/or to filter disturbances, makes it possible to minimise the issues linked to acquiring the second signal S2, making the measuring machine fairly versatile.

Some algorithms are based on a combined detection of the first signal S1 and of the second signal S2 on the profile of a workpiece with a known geometry (for example, a rectangular gauge), for which it is necessary to measure at least one level or geometric parameter connected to the workpiece once it is placed in two different angular positions of the holding assembly 4.

A calibration of the system is thus performed using the analysis of this gauge, the result of which is used to determine the compensation and/or filtering to be performed in the generation of the second signal S2.

The control unit 13 is preferably configured to reconstruct the complete geometry of the measuring zone "M" by overlapping said first part S2' of the second signal S2 with said first part S1' of the first signal S1.

These first parts S1', S2' in fact correspond to the measurement/detection of the same portion of the external profile "EP" of the measuring zone "M" and their overlapping makes it possible to correlate together the two signals including them in the same absolute reference system.

In order to ensure the perfect overlap between the two measuring systems (optical assembly 6 and contactless measuring device 9), the control unit 13 is also configured to perform one or more calibration programs adapted to cover all the applications envisaged for the measuring machine according to the invention.

For example, the control unit 13 could be configured to perform a calibration procedure relating to the linearity of the contactless measuring device 9, preferably a series of geometric/trigonometric steps.

It should be noted that, the first signal S1 has a first item of information, representing an obstruction of the measuring zone "M".

The first signal S1 preferably has a first item of information representing an obstruction of the measuring zone "M" as the angular position of the holding assembly 4 changes.

Alternatively, or in addition, the first signal S1 has a first item of information representing an obstruction of the measuring zone "M" of the axial position of the optical assembly 6 (i.e., of the carriage 7).

In other words, the first signal S1 defines the external outline of the measuring zone "M" for each angular position sampled.

In the preferred embodiment, the first signal S1 illustrates a polar plot representing the external profile of the workpiece 100 (i.e., of the measuring zone "M") that can be detected using the optical assembly 6.

The first part S1' of the first signal S1 thus represents the shape (or the obstruction) of the external profile "EP" of the measuring zone "M" at one pre-set angular position (or multiple angular positions) of the holding assembly 4 and, therefore, of a determined angular section of the workpiece 100.

The second signal S2 preferably has a second item of information, representing the distance between said sensitive portion 9a of the contactless measuring sensor 9 and a portion incident to the beam of said measuring zone "M".

The second signal S2 preferably has a second item of information, representing the distance between said sensitive portion 9a of the contactless measuring sensor 9 and a portion incident to the beam of said measuring zone "M" as the angular position of the holding assembly 4 changes. Alternatively, or in addition, the second signal S2 could have a second item of information, representing the distance between said sensitive portion 9a of the contactless measuring sensor 9 and a portion incident to the beam of said measuring zone "M" as the axial position of the optical assembly 6 (i.e., of the carriage) changes.

In other words, the second signal S2 represents the trend of said distance as the angular position of the holding assembly 4 changes in a curve.

This curve is, in any case, a relative signal, which does not graphically represent the conformation of the measuring zone "M" and, therefore, would not allow the user to take useful measurements.

Thanks to the presence of the first parts S1', S2' of the first S1 and second signal S2, which can be "overlapped" since they represent the same portion of the external profile "EP" of the measuring zone, it is, in any case, possible to combine the two signals, obtaining a complete reconstruction of the profile of the measuring zone "M".

It should be noted that, in one of the embodiments of the invention, the measuring machine 1 comprises multiple contactless measuring devices 9 placed in different angular positions around said central axis "C".

In other words, the measuring machine 1 preferably comprises said contactless measuring device 9 and at least one additional contactless measuring device 9'.

In particular, these devices are configured to acquire said second signal S2 and at least one third signal S3 representing a distance between the sensitive portion 9a of the corresponding contactless measuring device 9 and multiple portions of said measuring zone "M".

The portions detected by the latter contactless measuring device 9' are different from those detected by the contactless measuring device 9, or simply (instantaneously) out-of-phase in relation to them, as a function of the shape of the workpiece 100 and/or of the type of machine.

Similarly to the second signal S2, the third signal S3 also comprises at least one first part S3' representing said first tract of the external profile "EP" of the measuring zone "M" and at least one second part S3" representing a geometrical feature of the workpiece 100 that cannot be detected using said optical assembly 6.

In addition, the control unit 13 is preferably configured to activate said plurality of contactless measuring devices 9, 9' at the same time in order to reduce the measuring time.

Therefore, the machine that is the subject of the invention preferably performs the following steps in a measuring procedure:

Optical scan: wherein the profile portion to be analysed is identified, to perform the corresponding optical measurement and establish, as a result, the level at which to position the distance sensor;

Optical measurement: wherein the image provided by the video camera is processed in order to return a profile signal relating to the desired profile portion;

Contactless scan: the carriage 7 is shifted so that the contactless measuring device 9 can, in turn, scan a part of the workpiece. This signal differs numerically from that generated by the video camera, in that, as already discussed, it is a relative signal, which always and only contains values belonging to the sensor measuring range, which do not reflect the actual dimension of the workpiece.

Combination of the two signals: wherein the control unit 13 processes the first signal S1 (optical profile) and the second signal S2 (contactless measuring device 9 profile) to extract the necessary information thereof to reconstruct the actual and complete profile of the desired zone.

This is possible thanks to the presence, in both signals, of a portion representing a common profile tract, using which it is possible to combine the absolute (optical) measurement with the relative one (contactless measuring device 9).

Thus, the measuring machine 1 of the invention can extract measurements that, in neither of the two systems, taken individually, would be possible.

A measuring machine 1 according to this invention, in fact, is useful for multiple applications, including, for example:

measurement of gears, with straight, helical, cylindrical, or conical teeth;

measurement of the surface roughness;

measurement of the chattering;

measurement of the depth of blind holes (including flaring or spot-facing, if present), keys or grooves in general;

width and/or length of blind holes (including flaring or spot-facing, if present), keys or grooves in general;

integration of the profile of the shape of moulded objects both for the external profile and for their concave part, also called "negative" part;

detection of the profile of undercuts and related measurements (e.g., diameter, depth, etc.);

detection of the thread profile, including whether the root is visible with the optical system due to the elevated crest of the helix of the screw thread;

measurement of the thickness of transparent or semi-transparent objects (like glass or bottles and containers, plexiglass, or plastic materials of any kind, precious stones or diamonds that are mounted/to be mounted on jewels of any kind) with resulting calculation of the correlation between the external profile (detected by the optical system) and the internal profile (detected as the difference between the external profile and the trend in thickness).

It should also be noted that, preferably, the machine 1 comprises a drive module 16 connected to the control unit 13 and configured to determine said pre-set measuring program and to drive said holding assembly 4, said optical assembly 6, and said contactless measuring device (or said devices) 9 as a result.

A user interface device 17 is preferably included that is connected to the drive module 16 and configured to enable a user to insert one or more data representing said measuring program.

In the preferred embodiment, the user interface device 17 and the drive module 16 constitute a PC or computer to which an authorised user can connect/log in in order to set and check the measurement.

The subject of this invention is also a measuring method actuated using the measuring machine described up until this point.

This method involves determining a first working position of said optical assembly.

On reaching said working position, the optical assembly is activated so as to strike a measuring zone of the workpiece 100 with light radiation.

It therefore involves acquiring, by means of said video acquisition means 6b, a first signal S1 representing an external profile EP of said measuring zone M comprising at least one first part S1' representing a first tract of the external profile EP.

At this point, a second working position for the contactless measuring device 9 is determined (which may also correspond to that which it assumes when the optical assembly is in the first working position).

On reaching this position, the contactless measuring device is activated.

It therefore involves acquiring a second signal S2 representing a distance between said sensitive portion 9a and a plurality of portions of said measuring zone M, in which said second signal S2 comprises at least one first part S2' representing said first tract of the external profile EP of the measuring zone M and at least one second part S2" representing a geometrical feature of the workpiece 100 that cannot be detected by means of said optical assembly 6.

According to the invention, the first S1 and the second signal S2 are used combined, using, as reference, said first parts S1', S2', so as to reconstruct the geometry of the measuring zone M.

The combining step preferably involves overlapping said first part S2' of the second signal S2 with said first part S1' of the first signal S1.

The invention achieves the purposes proposed and entails significant advantages.

In fact, the presence of an optical assembly integrated with a contactless measuring device according to what is described offers a series of benefits, both in relation to the classical optical system and in relation to a contact sensor such as, for example, a measuring probe, and for the greater number of applications and measurements that can be performed in terms of operational speed.

In terms of costs, too, the integration of the contactless measuring sensor is extremely competitive in relation to the use of multiple contact sensors, at the very least for the same measurements.

EXAMPLE

Figure 5:
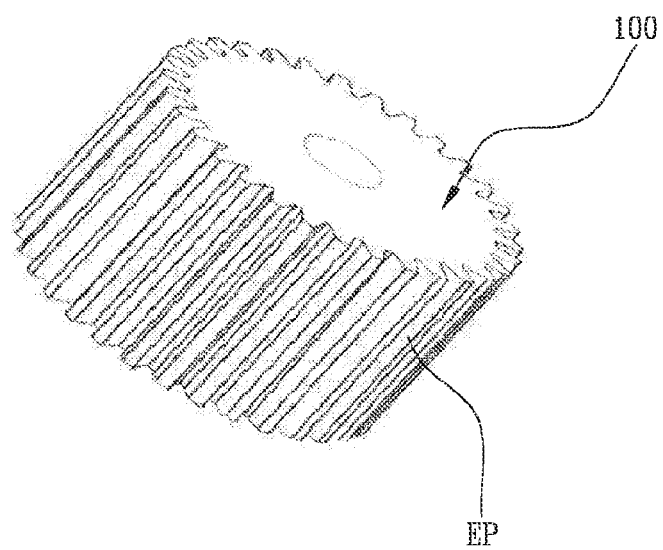
FIG. 5 shows the representation of a workpiece to be measured (measuring)

To confirm what is stated above, a feasibility check was performed on the teeth of the component shown in FIG. 5. To obtain the measurements, the control unit 13 imparts an axial position to the carriage 7 and activates the optical assembly 6 at the same time as a rotation of the workpiece 100 imparted by the holding assembly 4.

Figure 6:
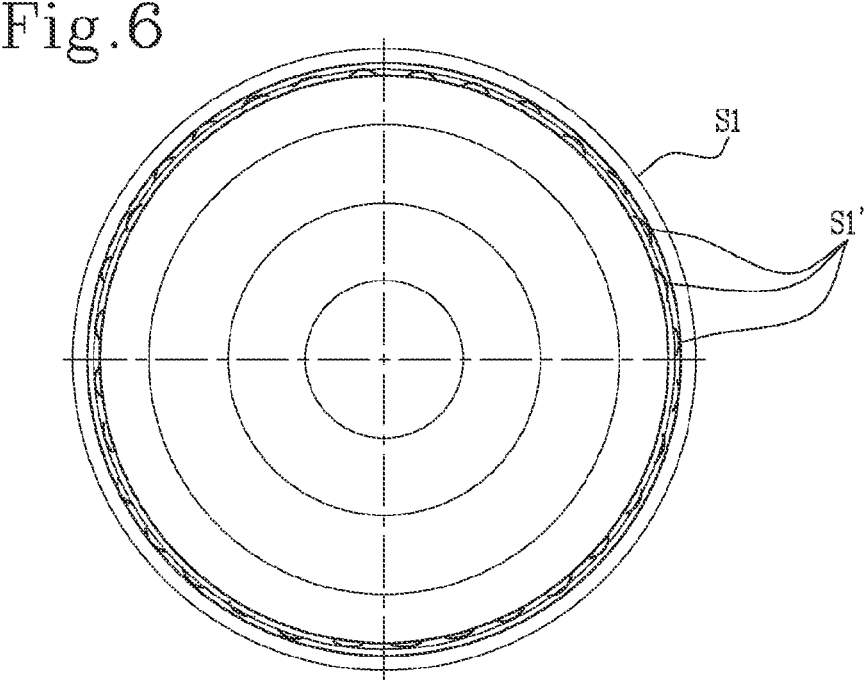
FIG. 6 shows the representation of the acquisition of a first signal in accordance with this invention.

In this way, the measuring zone is scanned and a measurement of the external diameter thereof is determined using the acquisition of the first signal S1, represented in FIG. 6.

Following this, the control unit 13 positions the contactless measuring device 9 at a suitable working distance from the workpiece (i.e., a prefixed distance), at the same axial position.

Alternatively, or in addition, the control unit 13 could also define an optimal inclination between the sensitive portion 9a and the portion incident to the measuring zone "M".

The contactless measuring device 9 is activated and the holding assembly 4 rotated, so as to acquire the second signal S2 representing the profile of the workpiece 100.

In greater detail, the contactless measuring device 9 detects and provides to the control unit the measurement signal MS (FIG. 7), which has disturbances and/or missing portions in some portions of the measuring zone, which, for example, have an angle of incidence not compatible with the limits of the measuring device 9.

Figure 7:
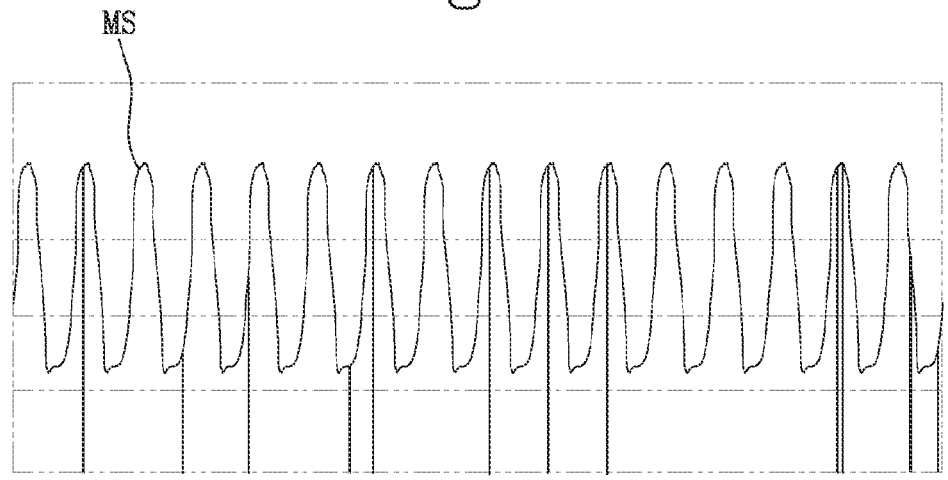
FIG. 7 shows the representation of a measurement signal in accordance with an embodiment of the invention.

At this point, the control unit 13 processes this measurement signal MS eliminating the peaks and reconstructing the curve as a function of a predefined algorithm so as to generate the second signal S2, which is preferably scaled in an angular position/distance Cartesian reference system (FIG. 7).

Figure 8:
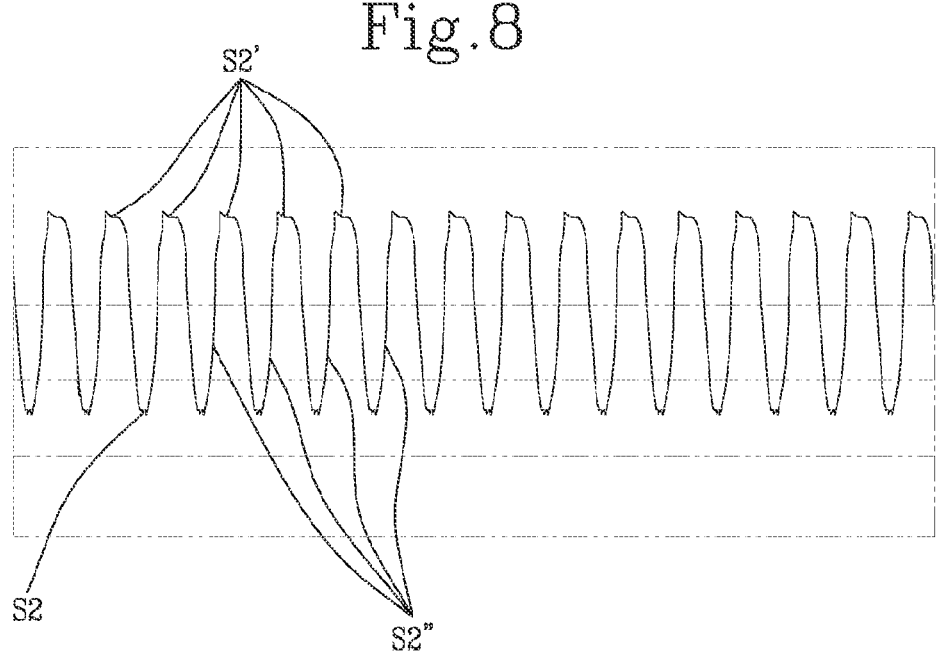
FIG. 8 shows the representation of the acquisition of a second signal in accordance with this invention.
Figure 9:
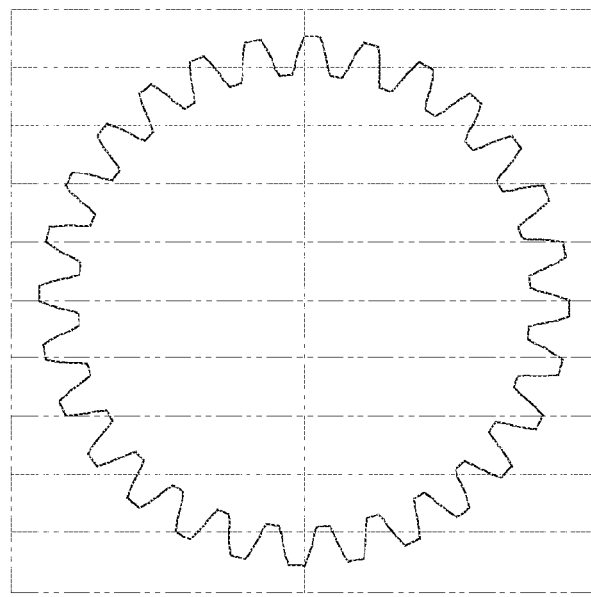
FIG. 9 shows the representation of the external profile of a workpiece using the combination of the first signal in FIG. 6 and the second signal in FIG. 8.

At this point, the first signal S1 and the second signal S2 are combined, inside of a system of polar coordinates, in order to reconstruct a representation of the profile of the workpiece to the level desired by overlapping the first portions S1' and S2' (FIG. 8).

From this reconstructed profile, it will then be possible to measure the shape of the "internal" parts, or those hidden by the external profile, like, for example:
 groove diameter;
 peak-peak or groove-crest height;
 primitive diameter of the tooth or roller level;
 concentricity or coaxality of the tooth compared to an axis calculated along any cylindrical part of the shaft;
 shape of the tooth (bevels, inclination of the sides, bending radii of the grooves, various asymmetries . . . ).

The invention claimed is:

1. An optical measuring machine, comprising:
 a frame;
 a holding assembly for a workpiece to be measured, said holding assembly being able to rotate around a central axis to rotate said workpiece around an axis of said workpiece;
 a sensing optical assembly including a lighting device including a light source, configured to generate light radiation, and a video acquisition device, including a video camera or other video recorder, aligned with the lighting device along an optical path of said light radiation transverse and incident to said central axis; said sensing optical assembly being mounted on a carriage slidably attached to the frame and movable along an axial handling direction to allow complete acquisition of an image representing said workpiece;
 a contactless measuring device, including a distance sensor configured for detecting a relative distance measurement representing a shape of the workpiece, connected to said sensing optical assembly to move with the sensing optical assembly along said axial direction and configured to detect a distance between a sensitive portion of the contactless measuring device and a surface of the workpiece to be measured;
 a further sensor configured to detect at least one angular position around the central axis of said holding assembly, one axial position along the axial handling direction of the optical assembly;
 a control unit including a controller connected to said further sensor, said sensing optical assembly, said holding assembly, and said contactless measuring device and configured to:
  determine a first working position of said sensing optical assembly;
  impart said first working position to the carriage and, on reaching said first working position, activate the sensing optical assembly at the same time of a rotation of the workpiece imparted by the holding assembly to strike a measuring zone of the workpiece with said light radiation and to acquire, by said video acquisition device, a first signal representative of an external profile of said measuring zone comprising at least one first part representing a first section of the external profile
  determine a second working position for the contactless measuring device, said second working position being at the same axial position of the first working position;
  activate the contactless measuring device and a rotation of the holding assembly on reaching said second working position and acquiring a second signal representing a distance between said sensitive portion and a plurality of portions of said measuring zone, in which said second signal comprises at least one first part representing said first section of the external profile of the measuring zone and at least one second part representing a geometrical feature of the workpiece that cannot be detected by said sensing optical assembly;

combine said first and said second signal using, as reference, said first parts of the first signal and second signal to reconstruct the geometry of the measuring zone;
wherein said control unit is configured to reconstruct the complete geometry of the measuring zone by overlapping said first part of the second signal with said first part of the first signal.

2. The measuring machine according to claim 1, wherein said control unit is configured to combine together said first and said second signal using said first parts of the first signal and of the second signal as reference and to generate a third signal having an information content representative of both said first and second signals and identifying the geometry of the measuring zone.

3. The measuring machine according to claim 1, wherein said first signal has a first information content, representing a size of the measuring zone as the angular position of the holding assembly changes and/or the axial position of the sensing optical assembly changes.

4. The measuring machine according to claim 1, wherein said second signal has a second information content, representing the distance between said sensitive portion of the contactless measuring device and a portion incident to said measuring zone when the angular position of the holding assembly and/or the axial position of the sensing optical assembly changes.

5. The measuring machine according to claim 1, wherein the control unit is configured to:
handle the sensing optical assembly along said axial direction;
stop the sensing optical assembly when said first working position is reached.

6. The measuring machine according to claim 1, wherein, following said acquisition of the first signal, the control unit is configured to:
handle the sensing optical assembly along said axial direction;
stop the sensing optical assembly when an axial level of the second working position is reached.

7. The measuring machine according to claim 1, wherein, following said acquisition of the first signal, said control unit is configured to place the contactless measuring device so that a sensitive portion of the contactless measuring device is arranged at a predetermined distance from an incident portion of said measuring zone.

8. The measuring machine according to claim 7, wherein said contactless measuring device is movable in relation to the sensing optical assembly along a radial direction transverse to the axial direction; said control unit being configured to handle the contactless measuring device along said radial direction, approaching said central axis, and to stop the contactless measuring device when said second working position is reached.

9. The measuring machine according to claim 1, wherein said contactless measuring device is attached to the sensing optical assembly through a slide oriented along a radial direction and comprises an actuator element configured to move the sensing optical assembly close to and away from said central axis.

10. The measuring machine according to claim 1, wherein said contactless measuring device is attached to the sensing optical assembly by one or more rotational joints that allow a variation in an inclination of the contactless measuring device in relation to the workpiece on one or more planes.

11. The measuring machine according to claim 10, wherein, following said acquisition of the first signal, said control unit is configured to place the contactless measuring device so that a sensitive portion of the contactless measuring device is arranged at a predetermined inclination in relation to an incident portion of said measuring zone.

12. The measuring machine according to claim 1, and further comprising a plurality of contactless measuring devices placed in distinct angular positions around said central axis so as to acquire said second signal and a third signal representing a distance between the sensitive portion of the corresponding contactless measuring device and a plurality of portions of said measuring zone, wherein said third signal comprises at least one first part representing said first section of the external profile of the measuring zone and at least one second part representing a geometric feature of the workpiece that cannot be detected by said sensing optical assembly.

13. The measuring machine according to claim 12, wherein said control unit is configured to activate said plurality of contactless measuring devices at the same time to reduce the measuring time.

14. The measuring machine according to claim 1, wherein said contactless measuring device includes a confocal sensor.

15. The measuring machine according to claim 1, wherein the control unit is configured for:
receiving from the contactless measuring device a measurement signal representing the distances actually detected by the sensitive portion;
processing said measurement signal in order to filter the noise and reconstruct any missing portions of the measurement signal according to one or more predefined algorithms;
generating said second signal as a result of said processing.

16. A measuring method performed by a measuring machine, comprising the steps of:
providing an optical measuring machine, comprising:
a frame;
a holding assembly for a workpiece to be measured, said holding assembly being able to rotate around a central axis to rotate said workpiece around an axis of said workpiece;
a sensing optical assembly including a lighting device including a light source configured to generate light radiation, and a video acquisition device, including a video camera or other video recorder, aligned with the lighting device along an optical path of said light radiation transverse and incident to said central axis; said sensing optical assembly being mounted on a carriage slidably attached to the frame and movable along an axial handling direction to allow complete acquisition of an image representing said workpiece;
a contactless measuring device, including a distance sensor configured for detecting a relative distance measurement representing a shape of the workpiece, connected to said sensing optical assembly to move with the sensing optical assembly along said axial direction and configured to detect a distance between a sensitive portion of the contactless measuring device and a surface of the workpiece to be measured;
a further sensor configured to detect at least one angular position around the central axis of said holding assembly, one axial position along the axial handling direction of the optical assembly;

a control unit including a controller connected to said further sensor, said sensing optical assembly, said holding assembly, and said contactless measuring device and configured to:
  determine a first working position of said sensing optical assembly;
  impart said first working position to the carriage and, on reaching said first working position, activate the sensing optical assembly at the same time of a rotation of the workpiece imparted by the holding assembly to strike a measuring zone of the workpiece with said light radiation and to acquire, by said video acquisition device, a first signal representative of an external profile of said measuring zone comprising at least one first part representing a first section of the external profile
  determine a second working position for the contactless measuring device, said second working position being at the same axial position of the first working position;
  activate the contactless measuring device and a rotation of the holding assembly on reaching said second working position and acquiring a second signal representing a distance between said sensitive portion and a plurality of portions of said measuring zone, in which said second signal comprises at least one first part representing said first section of the external profile of the measuring zone and at least one second part representing a geometrical feature of the workpiece that cannot be detected by said sensing optical assembly;
  combine said first and said second signal using, as reference, said first parts of the first signal and second signal to reconstruct the geometry of the measuring zone;
  wherein said control unit is configured to reconstruct the complete geometry of the measuring zone by overlapping said first part of the second signal with said first part of the first signal;
providing a workpiece on the holding assembly, said workpiece being positioned so as to be able to rotate around an axis of the workpiece;
determining the first working position of said sensing optical assembly;
activating said sensing optical assembly at a same time as a rotation of the workpiece imparted by the holding assembly on reaching said first working position in order to strike a measuring zone of the workpiece with said light radiation;
acquiring, by said video acquisition device, the first signal;
determining the second working position for the contactless measuring device;
activating the contactless measuring device and rotating the holding assembly on reaching said second working position;
acquiring the second signal
combining said first signal and said second signal using, as reference, said first parts of the first signal and second signal to reconstruct the geometry of the measuring zone, wherein said combining step comprises overlapping said first part of the second signal with said first part of the first signal.

\* \* \* \* \*